(12) United States Patent
Arakawa et al.

(10) Patent No.: US 10,815,319 B2
(45) Date of Patent: Oct. 27, 2020

(54) METHOD FOR PRODUCING HETEROPHASIC PROPYLENE POLYMER MATERIAL

(71) Applicant: Sumitomo Chemical Company, Limited, Tokyo (JP)

(72) Inventors: Masayuki Arakawa, Ichihara (JP); Satoshi Itoguchi, Ichihara (JP); Naoto Yoshimura, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 137 days.

(21) Appl. No.: 16/320,783

(22) PCT Filed: Aug. 1, 2017

(86) PCT No.: PCT/JP2017/027904
§ 371 (c)(1),
(2) Date: Jan. 25, 2019

(87) PCT Pub. No.: WO2018/025864
PCT Pub. Date: Feb. 8, 2018

(65) Prior Publication Data
US 2020/0181297 A1    Jun. 11, 2020

(30) Foreign Application Priority Data
Aug. 3, 2016 (JP) .................. 2016-153180

(51) Int. Cl.
*C08F 210/06* (2006.01)
*C08F 10/06* (2006.01)
*C08L 23/14* (2006.01)
*C08F 2/34* (2006.01)
*C08F 2/00* (2006.01)

(52) U.S. Cl.
CPC ............ *C08F 10/06* (2013.01); *C08F 210/06* (2013.01); *C08F 2/001* (2013.01); *C08F 2/34* (2013.01); *C08L 23/14* (2013.01); *C08L 2207/02* (2013.01)

(58) Field of Classification Search
CPC ......... C08F 210/06; C08F 2/34; C08F 2/001; C08L 23/14; C08L 2207/02
See application file for complete search history.

(56) References Cited

U.S. PATENT DOCUMENTS

| 7,816,447 | B2 * | 10/2010 | Lawson | B01J 19/2465 |
| | | | | 525/53 |
| 9,434,806 | B2 * | 9/2016 | Itoguchi | C08L 23/142 |
| 10,011,667 | B2 * | 7/2018 | Itoguchi | C08F 110/02 |
| 10,125,200 | B2 * | 11/2018 | Collina | C08F 10/06 |
| 10,537,871 | B2 * | 1/2020 | Itoguchi | B01J 8/28 |
| 10,683,373 | B2 * | 6/2020 | Itoguchi | C08F 2/34 |

| 2009/0209706 | A1* | 8/2009 | Sheard | C08F 297/083 |
| | | | | 525/240 |
| 2009/0292060 | A1 | 11/2009 | Suzuki et al. | |
| 2013/0267667 | A1* | 10/2013 | Paavilainen | C08F 2/04 |
| | | | | 526/75 |
| 2017/0240682 | A1 | 8/2017 | Imai et al. | |

FOREIGN PATENT DOCUMENTS

| JP | H10168142 A | 6/1998 |
| JP | 2000265015 A | 9/2000 |
| JP | 2001213923 A | 8/2001 |
| JP | 2005068239 A | 3/2005 |

(Continued)

OTHER PUBLICATIONS

International Search Report dated Oct. 31, 2017 in International Application No. PCT/JP2017/027904.
Written Opinion dated Oct. 31, 2017 in International Application No. PCT/JP2017/027904.

* cited by examiner

*Primary Examiner* — Rip A Lee
(74) *Attorney, Agent, or Firm* — Panitch Schwarze Belisario & Nadel LLP

(57) ABSTRACT

The invention relates to a production method of a heterophasic propylene polymerization material containing a propylene homopolymer (I-1) or a propylene copolymer (I-2), and a propylene copolymer (II), wherein the content of the propylene copolymer component (II) is 30% by weight or more, the production method containing the following steps (1) and (2):

Step (1): a step of polymerizing a monomer containing propylene in the presence of a catalyst for propylene polymerization to produce a propylene homopolymer (I-1) or a propylene copolymer (I-2), the step satisfying the formula (A):

$$1100 \leq \alpha(1.34\beta)^{1/3} \quad (A)$$

wherein, α represents the median diameter (unit: μm) of the catalyst for propylene polymerization and β represents the production amount (unit: g/g) of the propylene homopolymer (I-1) or the propylene copolymer (I-2) per 1 g of the catalyst for propylene polymerization in the step (1);

Step (2): a step of copolymerizing at least one olefin selected from the group consisting of ethylene and α-olefins having the number of carbon atoms of 4 or more and 12 or less, and propylene in the presence of the propylene homopolymer (I-1) or the propylene copolymer (I-2) obtained in the step (1), using 1 or more gas phase polymerization reactors, to produce a propylene copolymer (II), wherein the concentration of alkanes having the number of carbon atoms of 6 or more in the final gas phase polymerization reactor of the 1 or more gas phase polymerization reactors is 0.01% by volume or more and 0.6% by volume or less.

3 Claims, No Drawings

(56) References Cited

FOREIGN PATENT DOCUMENTS

| | | | |
|---|---|---|---|
| JP | 2006219667 A | 8/2006 | |
| JP | 2007277283 A | 10/2007 | |
| JP | 2009292963 A | 12/2009 | |
| WO | WO 2008/015113 A2 * | 2/2008 | ............ C08F 210/06 |
| WO | 2016031600 A1 | 3/2016 | |

METHOD FOR PRODUCING HETEROPHASIC PROPYLENE POLYMER MATERIAL

CROSS-REFERENCE TO RELATED APPLICATION

This application is a Section 371 of International Application No. PCT/JP2017/027904, filed Aug. 1, 2017, which was published in the Japanese language on Feb. 8, 2018, under International Publication No. WO 2018/025864 A1, which claims priority under 35 U.S.C. § 119(b) to Japanese Patent Application No. 2016-153180, filed on Aug. 3, 2016, the disclosures of which are incorporated herein by reference in their entireties.

TECHNICAL FIELD

The present invention relates to a production method of a heterophasic propylene polymerization material.

BACKGROUND ART

Heterophasic propylene polymerization materials comprising a propylene homopolymer and a copolymer of propylene and an α-olefin other than propylene are widely used in the fields of automobile parts, household electrical appliances, food and medical containers, building and civil engineering materials and the like. As the production method of the propylene polymerization materials, for example, a method in which propylene is polymerized by a slurry polymerization method to obtain a propylene homopolymer component in the first stage polymerization step, then, propylene and ethylene are copolymerized by a gas phase polymerization method to obtain a propylene-based block copolymer in the second stage polymerization step is described (see Patent Document 1).

PRIOR ART DOCUMENT

Patent Document

Patent Document 1: Japanese Unexamined Patent Application Publication (JP-A) No. Hei-10-168142

SUMMARY OF THE INVENTION

Problem to be Solved by the Invention

In recent years, a heterophasic propylene polymerization material having a high content of copolymer components to be polymerized in the second stage polymerization step has been demanded. However, there was a problem that agglomerates tended to be generated in the polymerization reactor when attempting to produce a heterophasic propylene polymerization material having the high content of copolymer components.

The present invention has been made in view of the above-described problem, and its object is to provide a method capable of continuously producing a heterophasic propylene polymerization material having the high content of copolymer components stably while suppressing generation of agglomerates.

Means for Solving the Problem

The present invention provides the followings.

<1> A production method of the following heterophasic propylene polymerization material comprising a propylene homopolymer (I-1) or the following propylene copolymer (I-2) and the following propylene copolymer (II), the production method comprising the following step (1) and the following step (2):

Step (1): a step of polymerizing a monomer containing propylene in the presence of a catalyst for propylene polymerization to produce a propylene homopolymer (I-1) or a propylene copolymer (I-2), the step satisfying the following formula (A):

$$1100 \leq \alpha(1.34\beta)^{1/3} \tag{A}$$

in the formula (A),

α represents the median diameter (unit: μm) of the catalyst for propylene polymerization, β represents the production amount (unit: g/g) of the propylene homopolymer (I-1) or the propylene copolymer (I-2) per 1 g of the catalyst for propylene polymerization in the step (1);

Step (2): a step of copolymerizing at least one olefin selected from the group consisting of ethylene and α-olefins having the number of carbon atoms of 4 or more and 12 or less, and propylene in the presence of the propylene homopolymer (I-1) or the propylene copolymer (I-2) obtained in the step (1), using 1 or more gas phase polymerization reactors, to produce a propylene copolymer (II), wherein the concentration of alkanes having the number of carbon atoms of 6 or more in the final gas phase polymerization reactor of the 1 or more gas phase polymerization reactors is 0.01% by volume or more and 0.6% by volume or less;

Heterophasic propylene polymerization material: a heterophasic propylene polymerization material comprising a propylene homopolymer or the following propylene copolymer (I-2), and the following propylene copolymer (II), wherein the content of the propylene copolymer (II) is 30% by weight or more, provided that the total weight of the heterophasic propylene polymerization material is taken as 100% by weight;

Propylene copolymer (I-2): a propylene copolymer containing a monomer unit derived from propylene and a monomer unit derived from at least one olefin selected from the group consisting of ethylene and α-olefins having the number of carbon atoms of 4 or more and 12 or less, wherein the content of the monomer unit derived from at least one olefin selected from the group consisting of ethylene and α-olefins having the number of carbon atoms of 4 or more and 12 or less is 0.01% by weight or more and less than 15% by weight, provided that the total weight of the propylene copolymer (I-2) is taken as 100% by weight;

Propylene copolymer (II): a propylene copolymer containing a monomer unit derived from at least one olefin selected from the group consisting of ethylene and α-olefins having the number of carbon atoms of 4 or more and 12 or less and a monomer unit derived from propylene, wherein the content of the monomer unit derived from at least one olefin selected from the group consisting of ethylene and α-olefins having the number of carbon atoms of 4 or more and 12 or less is 15% by weight or more and 80% by weight or less, provided that the total weight of the propylene copolymer (II) is taken as 100% by weight.

<2> The production method of the heterophasic propylene polymerization material according to <1>, wherein the content of alkanes having 6 carbon atoms in the final gas phase polymerization reactor in the step (2) is 0.01% by volume or more and 0.3% by volume or less.

<3> The production method of the heterophasic propylene polymerization material according to <1> or <2>, wherein the content of the propylene copolymer (II) in the heterophasic propylene polymerization material is 40% by weight or more.

Effects of the Invention

According to the present invention, a heterophasic propylene polymerization material having the high content of copolymer components can be continuously produced stably while suppressing generation of agglomerates.

MODES FOR CARRYING OUT THE INVENTION

<Production Method of the Heterophasic Propylene Polymerization Material>

The production method of the heterophasic propylene polymerization material of the present invention is a production method of the following heterophasic propylene polymerization material comprising a propylene homopolymer (I-1) or the following propylene copolymer (I-2), and the following propylene copolymer (II), and the production method comprising the following step (1) and the following step (2).

Step (1): a step of polymerizing a monomer containing propylene in the presence of a catalyst for propylene polymerization to produce a propylene homopolymer (I-1) or a propylene copolymer (I-2), the step satisfying the following formula (A):

$$1100 \leq \alpha(1.34\beta)^{1/3} \quad (A)$$

in the formula (A),

α represents the median diameter (unit: μm) of the catalyst for propylene polymerization, β represents the production amount (unit: g/g) of the propylene homopolymer (I-1) or the propylene copolymer (I-2) per 1 g of the catalyst for propylene polymerization in the step (1);

Step (2): a step of copolymerizing at least one olefin selected from the group consisting of ethylene and α-olefins having the number of carbon atoms of 4 or more and 12 or less, and propylene in the presence of the propylene homopolymer (I-1) or the propylene copolymer (I-2) obtained in the step (1), using 1 or more gas phase polymerization reactors, to produce a propylene copolymer (II), wherein the concentration of alkanes having the number of carbon atoms of 6 or more in the final gas phase polymerization reactor of the 1 or more gas phase polymerization reactors is 0.01% by volume or more and 0.6% by volume or less.

Heterophasic propylene polymerization material: a heterophasic propylene polymerization material comprising a propylene homopolymer or the following propylene copolymer (I-2), and the following propylene copolymer (II), wherein the content of the propylene copolymer (II) is 30% by weight or more (wherein, the total weight of the heterophasic propylene polymerization material is taken as 100% by weight).

Propylene copolymer (I-2): a propylene copolymer containing a monomer unit derived from propylene and a monomer unit derived from at least one olefin selected from the group consisting of ethylene and α-olefins having the number of carbon atoms of 4 or more and 12 or less, wherein the content of the monomer unit derived from at least one olefin selected from the group consisting of ethylene and α-olefins having the number of carbon atoms of 4 or more and 12 or less described above is 0.01% by weight or more and less than 15% by weight (wherein, the total weight of the propylene copolymer (I-2) is taken as 100% by weight).

Propylene copolymer (II): a propylene copolymer containing a monomer unit derived from at least one olefin selected from the group consisting of ethylene and α-olefins having the number of carbon atoms of 4 or more and 12 or less and a monomer unit derived from propylene, wherein the content of the monomer unit derived from at least one olefin selected from the group consisting of ethylene and α-olefins having the number of carbon atoms of 4 or more and 12 or less described above is 15% by weight or more and 80% by weight or less (wherein, the total weight of the propylene copolymer (II) is taken as 100% by weight).

One embodiment of the production method of a heterophasic propylene polymerization material of the present invention will be illustrated in detail below.

<Constitution of Heterophasic Propylene Polymerization Material>

The heterophasic propylene polymerization material according to the present embodiment is (i) a heterophasic propylene polymerization material comprising a propylene homopolymer (I-1) and a propylene copolymer (II) or (ii) a heterophasic propylene polymerization material comprising a propylene copolymer (I-2) and a propylene copolymer (II).

[Propylene Homopolymer (I-1)]

In the present embodiment, the propylene homopolymer (I-1) is a homopolymer composed of a monomer unit derived from propylene.

[Propylene Copolymer (I-2)]

In the present embodiment, the propylene copolymer (I-2) is a propylene copolymer containing a monomer unit derived from propylene and a monomer unit derived from at least one olefin selected from the group consisting of ethylene and α-olefins having the number of carbon atoms of 4 or more and 12 or less, wherein the content of the monomer unit derived from at least one olefin selected from the group consisting of ethylene and α-olefins having the number of carbon atoms of 4 or more and 12 or less described above is 0.01% by weight or more and less than 15% by weight (wherein, the total weight of the propylene copolymer (I-2) is taken as 100% by weight).

The α-olefin having the number of carbon atoms of 4 or more and 12 or less to introduce a monomer unit derived from an α-olefin having the number of carbon atoms of 4 or more and 12 or less in the propylene copolymer (I-2) includes, for example, 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, 2,2,4-trimethyl-1-pentene and the like, preferably 1-butene, 1-hexene and 1-octene, more preferably 1-butene.

The propylene copolymer (I-2) includes, for example, a propylene-ethylene copolymer, a propylene-1-butene copolymer, a propylene-1-hexene copolymer, a propylene-1-octene copolymer, a propylene-1-decene copolymer, a propylene-ethylene-1-butene copolymer, a propylene-ethylene-1-hexene copolymer, a propylene-ethylene-1-octene copolymer, a propylene-ethylene-1-decene copolymer and the like, preferably a propylene-ethylene copolymer, a propylene-1-butene copolymer and a propylene-ethylene-1-butene copolymer.

In the present embodiment, the propylene copolymer (I-2) may be a random copolymer, and specific examples thereof include, for example, a propylene-ethylene random copolymer, a propylene-α-olefin random copolymer and a propylene-ethylene-α-olefin random copolymer.

[Propylene Copolymer (II)]

In the present embodiment, the propylene copolymer (II) is a propylene copolymer containing a monomer unit derived from at least one olefin selected from the group consisting of ethylene and α-olefins having the number of carbon atoms of 4 or more and 12 or less and a monomer unit derived from propylene, wherein the content of the monomer unit derived from at least one olefin selected from the group consisting of ethylene and α-olefins having the number of carbon atoms of 4 or more and 12 or less described above is 15% by weight or more and 80% by weight or less (wherein, the total weight of the propylene copolymer (II) is taken as 100% by weight).

Specific examples of the α-olefin having the number of carbon atoms of 4 or more and 12 or less to introduce a monomer unit derived from an α-olefin having the number of carbon atoms of 4 or more and 12 or less in the propylene copolymer (II) include the same examples as listed as specific examples of an α-olefin having the number of carbon atoms of 4 or more and 12 or less in the propylene copolymer (I-2) described above.

The propylene copolymer (II) includes, for example, a propylene-ethylene copolymer, a propylene-1-butene copolymer, a propylene-1-hexene copolymer, a propylene-1-octene copolymer, a propylene-1-decene copolymer, a propylene-ethylene-1-butene copolymer, a propylene-ethylene-1-hexene copolymer, a propylene-ethylene-1-octene copolymer, a propylene-ethylene-1-decene copolymer and the like, preferably a propylene-ethylene copolymer, a propylene-1-butene copolymer and a propylene-ethylene-1-butene copolymer.

In the present embodiment, the content of the propylene copolymer (II) in a heterophasic propylene polymerization material is 30% by weight or more, and from the standpoint of impact resistance of a molded article, it is preferably 40% by weight or more, more preferably 50% by weight or more (wherein, the total weight of the heterophasic propylene polymerization material is taken as 100% by weight).

In the heterophasic propylene polymerization material according to the present embodiment, the limiting viscosity [η]II of the propylene copolymer (II) is preferably 0.1 to 10 dL/g, more preferably 1 to 5 dL/g, further preferably 1.5 to 4 dL/g.

[Heterophasic Propylene Polymerization Material]

The heterophasic propylene polymerization material obtained by the production method of the present invention is fine-particulate, and its median diameter is preferably 1300 μm or more, more preferably 1900 μm or more. The median diameter of a heterophasic propylene polymerization material is preferably 5000 μm or less, more preferably 4000 μm or less. It is preferable for the median diameter range to fall within this range from the standpoint of improvement of the powder property, the load on a compressor for circulation gas in a gas phase polymerization reactor and the like.

In the present specification, the median diameter of a heterophasic propylene polymerization material is a volume-based median diameter obtained by a laser diffraction mode particle size distribution measurement apparatus.

The static bulk density of a heterophasic propylene polymerization material obtained by the production method of the present invention is preferably 0.400 to 0.500 g/mL, more preferably 0.420 to 0.500 g/mL, further preferably 0.450 to 0.500 g/mL. In the present specification, the static bulk density denotes the index of the powder property.

Subsequently, the production method of a heterophasic propylene polymerization material according to the present embodiment will be specifically illustrated.

<Production Method of Heterophasic Propylene Polymerization Material>

The production method of a heterophasic propylene polymerization material according to the present embodiment (hereinafter, referred to also as "present production method") is a method for producing a heterophasic propylene polymerization material having the constitution described above, and comprises the step (1) and the step (2). Each step will be illustrated in detail below.

[Step (1)]

The step (1) according to the present embodiment is a step of polymerizing a monomer containing propylene in the presence of a catalyst for propylene polymerization, to produce a propylene homopolymer (I-1) or a propylene copolymer (I-2) described above, satisfying the following formula (A).

$$1100 \leq \alpha(1.34\beta)^{1/3} \quad (A)$$

In the formula (A),

α represents the median diameter (unit: μm) of the catalyst for propylene polymerization, and β represents the production amount (unit: g/g) of the propylene homopolymer (I-1) or the propylene copolymer (I-2) per 1 g of the catalyst for propylene polymerization in the step (1).

In the present specification, the median diameter of a catalyst for propylene polymerization is a median diameter determined by a laser diffraction•scattering method according to ISO13320:2009.

The median diameter of a catalyst for propylene polymerization is preferably 40 to 80 μm.

The production amount of a propylene homopolymer (I-1) or a propylene copolymer (I-2) per 1 g of a catalyst for propylene polymerization in the step (1) is preferably 10,000 to 30,000 g/g. The production amount of a propylene homopolymer (I-1) or a propylene copolymer (I-2) per 1 g of a catalyst for propylene polymerization in the step (1) can be increased by elongating the residence time of the above-described homopolymer or the above-described copolymer in the polymerization reactor in the step (1).

When Ziegler Natta catalysts described later are used as the catalyst for propylene polymerization, the median diameter of a catalyst for propylene polymerization in the formula (A) is the median diameter of a solid catalyst component containing a titanium atom and a magnesium atom of the Ziegler Natta catalyst.

The catalyst for propylene polymerization includes a Ziegler Natta catalyst, a metallocene type catalyst and the like, preferably a Ziegler Natta catalyst. The Ziegler Natta catalyst includes catalysts containing a solid catalyst component containing a titanium atom and a magnesium atom. It is preferable that the above-described solid catalyst component further contains a halogen atom. The above-described solid catalyst component can be obtained by bringing a magnesium compound into contact with a titanium compound. The above-described titanium compound is preferably a halogenated titanium compound.

The Ziegler Natta catalyst may contain an organic aluminum component and/or an electron donating compound, in addition to the above-described solid catalyst component. The Ziegler Natta catalyst is preferably a catalyst containing the above-described solid catalyst component and an organic aluminum component or a catalyst containing the above-described solid catalyst component, an organic aluminum component and an electron donating compound.

As the catalyst for propylene polymerization, those preliminarily activated by bringing into contact with a small amount of olefin may be used.

In the present embodiment, the propylene homopolymer (I-1) can be obtained by homopolymerizing propylene. The propylene copolymer (I-2) can be obtained by copolymerizing propylene and at least one olefin selected from the group consisting of ethylene and α-olefins having the number of carbon atoms of 4 or more and 12 or less. In this operation, for example, bulk polymerization can be adopted as the polymerization method. Bulk polymerization is a method in which a propylene monomer is used as the polymerization solvent, a catalyst for propylene polymerization is dispersed in this polymerization solvent, and polymerization is performed under the condition wherein the generating polymer is not dissolved in the polymerization solvent. In this case, polymerization is conducted at temperature and pressure under which the polymerization solvent is maintained in liquid state and the generating polymer is not dissolved in the polymerization solvent. The polymerization temperature is usually 30 to 100° C., preferably 50 to 80° C. The polymerization pressure is usually normal pressure to 10 MPa, preferably 0.5 to 5 MPaG.

For bulk polymerization, public-known polymerization reactor, for example, a stirring tank type reactor, a loop type reactor and the like described in Japanese Examined Patent Application Publication Nos. sho-41-12916, sho-46-11670 and sho-47-42379 can be used.

For controlling the molecular weight of the polymer, for example, a chain transfer agent such as hydrogen and the like may be used.

In the present embodiment, the propylene homopolymer (I-1) or the propylene copolymer (I-2) may be produced by sequential polymerization in the same reactor, or may be continuously produced by sequential polymerization in a multistage polymerization reactor having a plurality of reactors connected serially.

[Step (2)]

The step (2) according to the present embodiment is a step of copolymerizing at least one olefin selected from the group consisting of ethylene and α-olefins having the number of carbon atoms of 4 or more and 12 or less, and propylene in the presence of the propylene homopolymer (I-1) or the propylene copolymer (I-2) obtained in the step (1), using 1 or more gas phase polymerization reactors, to produce a propylene copolymer (II) described above, wherein the concentration of alkanes having 6 carbon atoms in the final gas phase polymerization reactor of the 1 or more gas phase polymerization reactors is 0.01% by volume or more and 0.6% by volume or less.

In the step (2), the propylene homopolymer (I-1) or the propylene copolymer (I-2) obtained in the step (1) is continuously supplied to a gas phase polymerization reactor, and copolymerization of at least one olefin selected from the group consisting of ethylene and α-olefins having the number of carbon atoms of 4 or more and 12 or less and propylene is conducted in gas phase in the presence of the polymer.

In the gas phase polymerization reactor, the polymerization temperature is usually 0 to 120° C., preferably 20 to 100° C., more preferably 40 to 100'C.

The polymerization pressure may be in a range wherein an olefin can exist as gas phase in the gas phase polymerization reactor, and is usually normal pressure to 10 MPaG, preferably 0.2 to 8 MPaG, more preferably 0.5 to 5 MPaG.

In the present embodiment, copolymerization is performed using 1 or more, preferably 3 or more gas phase polymerization reactor. Further, in the present embodiment, the concentration of alkanes having the number of carbon atoms of 6 or more in the final gas phase polymerization reactor of the 1 or more gas phase polymerization reactors is 0.01% by volume or more and 0.6% by volume or less, preferably 0.01% by volume or more and 0.3% by volume or less. It is preferable for the above-described alkane concentration to fall within the above-described range from the standpoint of improvement of the powder property. In the present specification, when a plurality of gas phase polymerization reactors are used, "the final gas phase polymerization reactor" denotes a gas phase polymerization reactor situated at the most downstream side. Further, when one gas phase polymerization reactor is used, this one gas phase polymerization reactor is the final gas phase polymerization reactor.

In the present embodiment, the alkane having the number of carbon atoms of 6 or more includes hexane, heptane and the like. In the present embodiment, the concentration of the alkane having the number of carbon atoms of 6 or more in the final gas phase polymerization reactor can be measured, for example, by placing a process gas chromatography in the circulating gas line.

As the gas phase polymerization reactor, public-known polymerization reactors, for example, reactors described in JP-A No. Sho-58-201802, JP-A No. Sho-590126406, JP-A No. Hei-2-233708 and the like can be used.

According to the present production method, a heterophasic propylene polymerization material is obtained as a mixture having a structure in which the propylene copolymer (II) is dispersed in a matrix of the propylene homopolymer (I-1) or the propylene copolymer (II) in the step (2).

<Application of Heterophasic Propylene Polymerization Material>

The heterophasic propylene polymerization material of the present invention can be suitably used in a molding method such as, for example, an extrusion molding method, an injection molding method, a compression molding method, a foaming molding method, a hollow molding method, a blow molding method, a vacuum molding method, a powder molding method, a calender molding method, an inflation molding method, a press molding method and the like.

The application of the heterophasic propylene polymerization material of the present invention includes, for example, automobile parts such as automobile interior parts and exterior parts and the like, food and medical containers, furniture and electric appliance parts, civil engineering and construction materials and the like. The automobile interior parts include, for example, an instrumental panel, a trim, a door panel, a side protector, a console box, a column cover and the like. The automobile exterior parts include, for example, a bumper, a fender, a wheel cover and the like. The food and medical containers include, for example, a wrapping film, a food container, an infusion bag, an infusion bottle and the like. The furniture and electric appliance parts include, for example, wallpaper, flooring materials, decorative sheets, drainage hoses of a washing machine and the like. The civil engineering and construction materials include, for example, a waterproof sheet, a water-impermeable sheet, a hose, a duct, a gasket and the like.

EXAMPLES

Embodiments of the present invention will be illustrated further in detail by examples shown below.

Measurement values of each item in examples and comparative examples were measured by the following methods.

(1) Content of Propylene Copolymer (II) (X, Unit: % by Weight)

The content (X) (unit: % by weight) of a propylene copolymer (II) in the resultant heterophasic propylene polymerization material was calculated by the following equation based on the crystal melting heat quantity of a propylene homopolymer (I-1) and the crystal melting heat quantity of the whole heterophasic propylene polymerization material. The crystal melting heat quantity was measured by differential scanning calorimetry (DSC).

$$X=(1-(\Delta Hf)T/(\Delta Hf)P) \times 100$$

X: Content by weight) of propylene copolymer (II) in heterophasic propylene polymerization material $(\Delta Hf)T$: Melting heat quantity (J/g) of whole heterophasic propylene polymerization material $(\Delta Hf)P$: Melting heat quantity (J/g) of propylene homopolymer (I-1)

(2) Limiting Viscosity (Unit: dL/g)

(2)-1. Limiting Viscosity ($[\eta]T$) of Whole Heterophasic Propylene Polymerization Material and Limiting Viscosity ($[\eta]I$) of Propylene Homopolymer (I-1)

Using a Ubbelohde type viscometer, the reduced viscosity was measured at three concentrations of 0.1 g/dL, 0.2 g/dL and 0.5 g/dL. The limiting viscosity was determined by a calculation method described in the reference literature "Polymer Solution, Polymer Experimental Study 11" (published by Kyoritsu Shuppan Co., Ltd., 1982), p. 491, that is, an extrapolation method of plotting the reduced viscosity against the concentration and extrapolating the density to zero. The reduced viscosity was measured at a temperature of 135° C. using tetralin as the solvent.

(2)-2. Limiting Viscosity $[\eta]II$ of Propylene Copolymer (II)

The limiting viscosity $[\eta]II$ of a propylene copolymer (II) was calculated by the following equation.

$$[\eta]II=([\eta]T-[\eta]I\times(1-X/100))\times 100/X$$

$[\eta]I$: Limiting viscosity (dL/g) of propylene homopolymer (I-1)

$[\eta]T$: Limiting viscosity (dL/g) of heterophasic propylene polymerization material (3) Ethylene Content (Unit: % by Weight)

(3)-1) Content of Monomer Unit Derived from Ethylene Based on Whole Heterophasic Propylene Polymerization Material ((C2')T)

The content was determined from the $^{13}$C-NMR spectrum measured under the following conditions based on a report of Kakugo, et al. (reference literature: Macromolecules 1982, 15, 1150-1152)

<Carbon Nuclear Magnetic Resonance ($^{13}$C-NMR) Measurement Conditions>

Apparatus: AVANCEIII 600HD manufactured by Bruker BioSpin Corp.

Measuring probe: 10 mm cryoprobe

Measuring solvent: mixed liquid of 1,2-dichlorobenzene/1,1,2,2-tetrachloroethane-d$_2$=85/15 (volume ratio)

Measuring concentration: 100 mg/mL

Measuring temperature: 135° C.

Measuring method: proton decoupling method

Cumulative number: 256 times

Pulse width: 45°

Pulse repetition time: 4 sec

Measurement standard: tetramethylsilane (3-2) Content of Monomer Unit Derived from Ethylene in Propylene Copolymer (II) ((C2')II)

The content (C2')II of a monomer unit derived from ethylene in a propylene copolymer (II) was calculated by the following equation.

$$(C2')II=(C2')T/(X/100)$$

(C2')T: Content of monomer unit derived from ethylene with respect to whole heterophasic propylene polymerization material (° by weight)

X: Content of propylene copolymer (II) in heterophasic propylene polymerization material (% by weight)

(4) Measurement of Median Diameter of Heterophasic Propylene Polymerization Material The median diameter of a heterophasic propylene polymerization material was measured using a laser diffraction mode particle size distribution measurement apparatus (HELOS, manufactured by Sy MPatec).

(5) Median Diameter (D50) of Solid Catalyst Component

The median diameter of a solid catalyst component was analyzed by a laser diffraction•scattering method according to ISO13320: 2009. The refractive index was 1.49 for toluene and 1.53-0.1i for a solid catalyst component by using a laser diffraction mode particle size distribution measurement apparatus ("Master Sizer 3000" manufactured by Malvern Panalytical Ltd.) as the measuring apparatus. A toluene solvent of which moisture had been removed previously with alumina and the like was charged into a dispersing apparatus (Hydro MV) of which aperture was sealed with nitrogen, to fill the inside of the circulation system including a measurement cell with the solvent. The stirring rate was set at 2,000 rpm and a powder sample was charged so as to give a scattering strength of 3 to 10% while circulating the solvent in the measurement cell without ultrasonic wave dispersion treatment. From the resultant particle size volume-based dispersion diagram (chart), the median diameter (D50) was determined. The sample was handled so as not to come into contact with atmospheric air and moisture, and the previous treatment was not conducted.

(6) Measurement of Static Bulk Density

The static bulk density was measured using a bulk specific gravity measuring apparatus according to JIS K6721.

(7) Measurement of Concentration of Alkane Having Number of Carbon Atoms of 6 or More in Final Gas Phase Polymerization Reactor The concentration of hexane as the alkane having the number of carbon atoms of 6 or more in the final gas phase polymerization reactor was measured, simultaneously with the concentrations of hydrogen, ethylene and propylene, using a process gas chromatography (manufactured by Yokogawa Electric Corp.) disposed in the circulation gas line of a gas phase polymerization reactor. Further, the concentration of heptane was measured by analysis by a gas chromatography (GC14B, manufactured by Shimadzu Corp.) of a gas sampled into a tetra-bag from the circulation gas line of a gas phase polymerization reactor.

(8) Calculation of Amount of Agglomerate of 5 mm or More

The amount of agglomerates having a diameter of 5 mm or more was calculated by the following equation using a stainless sieve having an aperture of 5 mm (TESTING SIEVE, manufactured by TOKYO SCREEN Co., Ltd.).

(amount of agglomerate of 5 mm or more [ppm by weight])=(weight of polymer remaining on sieve after sieving)/(weight of polymer before sieving)×1000000

(9) Evaluation of Operability operability was evaluated as described below.

operability o: a heterophasic propylene polymerization material could be continuously produced stably without generation of agglomerates in a gas phase reactor.

operability x: in a gas phase reactor, the flow state of polymer particles deteriorated, and agglomerates were generated in the reactor, or the flow state of polymer particles deteriorated, and the temperature in the reactor increased rapidly, and extraction failure occurred in extracting polymer particles from the reactor into the subsequent step, thus, a heterophasic propylene polymerization material could not be continuously produced stably.

(10) Production Amount $\mu$ (Unit: g/g) of Propylene Homopolymer (I-1) Per 1 g of Catalyst for Propylene Polymerization in Step (1)

The production amount $\beta$ (unit: g/g) of a propylene homopolymer (I-1) per 1 g of a catalyst for propylene polymerization in the step (1) was determined by the following equation.

$$\beta=10\gamma(100-X)/\varepsilon$$

(wherein, $\gamma$ represents the production amount (unit: kg/hr) of a heterophasic propylene polymerization material per unit time.

X represents the content of a propylene copolymer (II) (unit: % by weight) in a heterophasic propylene polymerization material.

$\varepsilon$ represents the supply amount (unit: g/hr) of a solid catalyst component in the step (1).

Example 1: Production of Heterophasic Propylene Polymerization Material (1-1a) Production of Solid Catalyst Component Step (1-1A): The atmosphere in a 100 mL flask equipped with a stirring machine, a dropping funnel and a thermometer was purged with nitrogen, then, 36.0 mL of toluene and 22.5 mL of titanium tetrachloride were added into the flask and stirred, to obtain a toluene solution of titanium tetrachloride. The temperature in the flask was adjusted to 0° C., then, at the same temperature, 1.88 g of magnesium diethoxide was added four times every 30 minutes, then, stirred at 0° C. for 1.5 hours. Then, 0.60 mL of ethyl 2-ethoxymethyl-3,3-dimethylbutanoate was added into the flask, then, the temperature in the flask was raised up to 10° C. Thereafter, the mixture was stirred at the same temperature for 2 hours, and 9.8 mL of toluene was added. Then, the temperature in the flask was elevated at a rate of 1.2 K/min, and 3.15 mL of ethyl 2-ethoxymethyl-3,3-dimethylbutanoate was added into the flask at a point of 60° C., and the mixture was heated up to 110° C. At the same temperature, the components added into the flask were stirred for 3 hours.

The resultant mixture was subjected to solid-liquid separation to obtain a solid. The solid was washed with 56.3 mL of toluene at 100° C. three times.

Step (1-1B): To the solid after washing was added 38.3 mL of toluene, to form a slurry. To the slurry were added 15.0 mL of titanium tetrachloride and 0.75 mL of ethyl 2-ethoxymethyl-3,3-dimethylbutanoate to form a mixture, and the mixture was stirred at 110° C. for 1 hour. Thereafter, the mixture stirred was subjected to solid-liquid separation, and the solid was washed with 56.3 mL of toluene at 60° C. three times, and further, washed with 56.3 mL of hexane at room temperature three times, and the solid after washing was dried under reduced pressure, to obtain a solid catalyst component for olefin polymerization. This solid catalyst component had a titanium atom content of 2.53% by weight, an ethoxy group content of by weight and an internal electron donor content of 13.7% by weight and had a median diameter of 59.5 µm.

(1-1b) Preliminary Activation

Into an SUS autoclave equipped with a stirring machine were added 1.3 L of sufficiently dehydrated and deaerated hexane, 20 mmol/L of triethylaluminum (hereinafter, referred to as TEA), tert-butyl-n-propyldimethoxysilane as the electron donor component and 7.8 g/L of a solid catalyst component (I) having a median diameter of 59.5 µm, and propylene was continuously supplied while keeping the temperature in the autoclave at 15° C. or less until the propylene supply amount per 1.0 g of the solid catalyst component reached 5.0 g, to carry out preliminary activation. The addition amount of tert-butyl-n-propyldimethoxysilane was 0.1 (mol/mol)=tert-butyl-n-propyldimethoxysilane/TEA. The slurry of the preliminarily activated catalyst was transferred to an SUS dilution tank equipped with a stirring machine, diluted by adding sufficiently purified liquid butane, and stored at a temperature of 10° C. or less. For preventing the slurry of the preliminarily activated catalyst from remaining in the autoclave and transferring its entire amount into the dilution tank, after transfer of the slurry of the preliminarily activated catalyst, the inside of the autoclave was washed with 1.3 L of sufficiently dehydrated and deaerated hexane, and its washing liquid was transferred into the dilution tank. This washing operation was conducted three times. The concentration of the slurry of the preliminarily activated catalyst in the dilution tank was 0.10 g/L.

(1-1c) Polymerization

Using an apparatus in which three vessel type reactors equipped with a stirring machine and one gas phase polymerization reactor were serially disposed, continuous polymerization was conducted. At each of the first tank, the second tank and the third tank of the vessel type reactor, propylene was continuously homopolymerized to produce a propylene homopolymer, which was transferred to the fourth tank (that is, the above-described gas phase reactor) without deactivating the produced polymer, and at the fourth tank, propylene and ethylene were continuously copolymerized, to produce a propylene-ethylene copolymer.

At the first tank of the vessel type reactor, propylene was supplied at 10 kg/h and hydrogen was supplied at 32 NL/h, and further, TEA having a concentration of 250 mmol/L adjusted using sufficiently dehydrated and deaerated hexane was supplied at 23.5 mmol/h, tert-butyl-n-propyldimethoxysilane having a concentration of 50 mmol/L adjusted using sufficiently dehydrated and deaerated hexane was supplied at 4.7 mmol/h and the slurry of the preliminarily activated catalyst produced in (1-1b) was supplied so that the supply amount of the solid catalyst component was 0.50 g/h, and these were continuously polymerized at a polymerization temperature of 58'C and a polymerization pressure of 3.6 MPaG.

At the second tank of the vessel type reactor, propylene was supplied at 3 kg/h and hydrogen was supplied at 3 NL/h in the presence of the polymer transferred continuously from the first tank, and these were continuously polymerized under conditions of a polymerization temperature of 57° C. and a polymerization pressure of 3.1 MPaG.

At the third tank of the vessel type reactor, propylene was supplied at 3 kg/h in the presence of the polymer transferred continuously from the second tank, and these were continuously polymerized under conditions of a polymerization temperature of 53° C. and a polymerization pressure of 2.8 MPaG, to obtain a propylene homopolymer.

The propylene homopolymer was partially extracted out of the system from the above-described third tank, and as a result of analysis thereof, the limiting viscosity [η]I of the propylene homopolymer was 1.06 dL/g.

At the fourth tank which is a gas phase polymerization reactor disposed downstream of the third tank of the vessel type reactor and corresponding to the final gas phase polymerization reactor, propylene, ethylene, hydrogen and heptane were continuously supplied so as to keep a hydrogen concentration of 2.4 vol %, an ethylene concentration of 39.7 vol %, a propylene concentration of 45.2 vol %, a hexane concentration of 0.2 vol % and a heptane concentration of 0.3 vol % in the gas phase portion in the presence of the propylene homopolymer transferred continuously from the third tank, and propylene and ethylene were continuously copolymerized under conditions of a polymerization temperature of 70° C. and a polymerization pressure of 1.6 MPaG, to stably obtain a heterophasic propylene polymerization material at 21.9 kg/h.

As a result of analysis of the resultant heterophasic propylene polymerization material, the limiting viscosity [η]T was 2.39 dL/g and the ethylene content (C'2)T was 34.40% by weight.

The content of the propylene-ethylene copolymer in the heterophasic propylene polymerization material generated at the fourth tank was 65.2% by weight. The limiting viscosity Nil of the propylene-ethylene copolymer was 3.10 dL/g and the ethylene content (C'2)II in the propylene-ethylene copolymer was 52.76% by weight.

Further, the resultant heterophasic propylene polymerization material was fine-particulate, and its median diameter was 2045 μm, and the static bulk density thereof was 0.440 g/mL. The amount of agglomerates having a diameter of 5 mm or more contained in the resultant heterophasic propylene polymerization material was 458 ppm by weight.

The analysis results of the resultant heterophasic propylene polymerization material are shown in Table 1.

TABLE 1

| | | heterophasic propylene polymerization material |
|---|---|---|
| [η]T | dL/g | 2.39 |
| (C'2)T | % by weight | 34.40 |
| [η]II | dL/g | 3.10 |
| (C'2)II | % by weight | 52.76 |
| content of propylene copolymer (II) | % by weight | 65.2 |
| β | g/g | 15242 |
| median diameter | μm | 2045 |
| static bulk density | g/mL | 0.440 |
| amount of agglomerate (5 mm or more) | ppm by weight | 458 |

Example 2: Production of Heterophasic Propylene Polymerization Material (1-1a) Production of Solid Catalyst Component A solid catalyst component was produced in the same manner as in Example 1.

(1-1b) Preliminary Activation

Into an SUS autoclave equipped with a stirring machine were added 1.3 L of sufficiently dehydrated and deaerated hexane, 20 mmol/L of TEA, tert-butyl-n-propyldimethoxysilane as the electron donor component and 7.8 g/L of a solid catalyst component (I) having a median diameter of 59.5 μm, and propylene was continuously supplied while keeping the temperature in the autoclave at 15'C or less until the propylene supply amount per 1.0 g of the solid catalyst component reached 5.0 g, to carry out preliminary activation. The addition amount of tert-butyl-n-propyldimethoxysilane was 0.1 (mol/mol)=tert-butyl-n-propyldimethoxysilane/TEA. The slurry of the preliminarily activated catalyst was transferred to an SUS dilution tank equipped with a stirring machine, diluted by adding sufficiently purified liquid butane, and stored at a temperature of 10° C. or less. For preventing the slurry of the preliminarily activated catalyst from remaining in the autoclave and transferring its entire amount into the dilution tank, after transfer of the slurry of the preliminarily activated catalyst, the inside of the autoclave was washed with 1.3 L of sufficiently dehydrated and deaerated hexane, and its washing liquid was transferred into the dilution tank. This washing operation was conducted three times. The concentration of the slurry of the preliminarily activated catalyst in the dilution tank was 0.10 g/L.

(1-1c) Polymerization

Using an apparatus in which three vessel type reactor equipped with a stirring machine and one gas phase polymerization reactor were serially disposed, continuous polymerization was conducted. At the first tank, the second tank and the third tank of the vessel type reactor, propylene was continuously homopolymerized to produce a propylene homopolymer, which was transferred to the fourth tank (that is, the above-described gas phase reactor) without deactivating the produced polymer, and at the fourth tank, propylene and ethylene were continuously copolymerized, to produce a propylene-ethylene copolymer.

At the first tank of the vessel type reactor, propylene was supplied at 10 kg/h and hydrogen was supplied at 32 NL/h, and further, TEA having a concentration of 250 mmol/L adjusted using sufficiently dehydrated and deaerated hexane was supplied at 23.1 mmol/h, tert-butyl-n-propyldimethoxysilane having a concentration of 50 mmol/L adjusted using sufficiently dehydrated and deaerated hexane was supplied at 4.7 mmol/h and the slurry of the preliminarily activated catalyst produced in (1-1b) was supplied so that the supply amount of the solid catalyst component was 0.52 g/h, and these were continuously polymerized at a polymerization temperature of 53° C. and a polymerization pressure of 3.6 MPaG.

At the second tank of the vessel type reactor, propylene was supplied at 3 kg/h and hydrogen was supplied at 3 NL/h in the presence of the polymer transferred continuously from the first tank, and these were continuously polymerized under conditions of a polymerization temperature of 57° C. and a polymerization pressure of 3.1 MPaG.

At the third tank of the vessel type reactor, propylene was supplied at 3 kg/h in the presence of the polymer transferred continuously from the second tank, and these were continuously polymerized under conditions of a polymerization temperature of 52° C. and a polymerization pressure of 2.8 MPaG, to obtain a propylene homopolymer.

The propylene homopolymer was partially extracted out of the system from the above-described third tank, and as a result of analysis thereof, the limiting viscosity [η]I of the propylene homopolymer was 1.06 dL/g.

At the fourth tank which is a gas phase polymerization reactor disposed downstream of the third tank of the vessel type reactor and corresponding to the final gas phase polymerization reactor, propylene, ethylene and hydrogen were continuously supplied so as to keep a hydrogen concentration of 2.3 vol %, an ethylene concentration of 39.6 vol %, a propylene concentration of 45.1 vol %, a hexane concentration of 0.3 vol % and a heptane concentration of 0.0 vol % in the gas phase portion in the presence of the propylene homopolymer transferred continuously from the third tank, and propylene and ethylene were continuously copolymerized under conditions of a polymerization temperature of 70° C. and a polymerization pressure of 1.6 MPaG, to stably obtain a heterophasic propylene polymerization material at 21.4 kg/h.

As a result of analysis of the resultant heterophasic propylene polymerization material, the limiting viscosity [η]T was 2.38 dL/g and the ethylene content (C' 2) T was 39.40% by weight.

The content of the propylene-ethylene copolymer in the heterophasic propylene polymerization material generated at the fourth tank was 65.4% by weight. The limiting viscosity [η]II of the propylene-ethylene copolymer was 3.08 dL/g and the ethylene content of the propylene-ethylene copolymer was 51.99% by weight.

Further, the resultant heterophasic propylene polymerization material was fine-particulate, its median diameter was 1974 μm, and the static bulk density thereof was 0.465 g/mL. The amount of agglomerates having a diameter of 5 mm or more contained in the resultant heterophasic propylene polymerization material was 320 ppm by weight.

The analysis results of the resultant heterophasic propylene polymerization material are shown in Table 2.

TABLE 2

|  |  | heterophasic propylene polymerization material |
|---|---|---|
| [η]T | dL/g | 2.38 |
| (C'2)T | % by weight | 39.40 |
| [η]II | dL/g | 3.08 |
| (C'2)II | % by weight | 51.99 |
| content of propylene copolymer (II) | % by weight | 65.4 |
| β | g/g | 14239 |
| median diameter | μm | 1974 |
| static bulk density | g/mL | 0.465 |
| amount of agglomerate (5 mm or more) | ppm by weight | 320 |

Comparative Example 1: Production of Heterophasic Propylene Polymerization Material (1-1a) Production of Solid Catalyst Component A solid catalyst component was produced in the same manner as in Example 1.

(1-1b) Preliminary Activation

Into an SUS autoclave equipped with a stirring machine were added 1.3 L of sufficiently dehydrated and deaerated hexane, 20 mmol/L of TEA, tert-butyl-n-propyldimethoxysilane as the electron donor component and 7.8 g/L of a solid catalyst component (I) having a median diameter of 59.5 μm, and propylene was continuously supplied while keeping the temperature in the autoclave at 15° C. or less until the propylene supply amount per 1.0 g of the solid catalyst component reached 5.0 g, to carry out preliminary activation. The addition amount of tert-butyl-n-propyldimethoxysilane was 0.1 (mol/mol)=tert-butyl-n-propyldimethoxysilane/TEA. The slurry of the preliminarily activated catalyst was transferred to an SUS dilution tank equipped with a stirring machine, diluted by adding sufficiently purified liquid butane, and stored at a temperature of 10° C. or less. For preventing the slurry of the preliminarily activated catalyst from remaining in the autoclave and transferring its entire amount into the dilution tank, after transfer of the slurry of the preliminarily activated catalyst, the inside of the autoclave was washed with 1.3 L of sufficiently dehydrated and deaerated hexane, and its washing liquid was transferred into the dilution tank. This washing operation was conducted three times. The concentration of the slurry of the preliminarily activated catalyst in the dilution tank was 0.10 g/L.

(1-1c) Polymerization

Using an apparatus in which three vessel type reactors equipped with a stirring machine and one gas phase polymerization reactor were serially disposed, continuous polymerization was conducted. At the first tank, the second tank and the third tank of the vessel type reactor, propylene was continuously homopolymerized to produce a propylene homopolymer, which was transferred to the fourth tank (that is, the first tank of the above-described gas phase reactor) without deactivating the produced polymer, and at the fourth tank, propylene and ethylene were continuously copolymerized, to produce a propylene-ethylene copolymer.

At the first tank of the vessel type reactor, propylene was supplied at 10 kg/h and hydrogen was supplied at 32 NL/h, and further, TEA having a concentration of 250 mmol/L adjusted using sufficiently dehydrated and deaerated hexane was supplied at 23.7 mmol/h, tert-butyl-n-propyldimethoxysilane having a concentration of 50 mmol/L adjusted using sufficiently dehydrated and deaerated hexane was supplied at 4.8 mmol/h and the slurry of the preliminarily activated catalyst produced in (1-1b) was supplied so that the supply amount of the solid catalyst component was 0.50 g/h, and these were continuously polymerized at a polymerization temperature of 58'C and a polymerization pressure of 3.6 MPaG.

At the second tank of the vessel type reactor, propylene was supplied at 3 kg/h and hydrogen was supplied at 3 NL/h in the presence of the polymer transferred continuously from the first tank, and these were continuously polymerized under conditions of a polymerization temperature of 57'C and a polymerization pressure of 3.1 MPaG.

At the third tank of the vessel type reactor, propylene was supplied at 3 kg/h in the presence of the polymer transferred continuously from the second tank, and these were continuously polymerized under conditions of a polymerization temperature of 52° C. and a polymerization pressure of 2.8 MPaG, to obtain a propylene homopolymer.

The propylene homopolymer was partially extracted out of the system from the above-described third tank, and as a result of analysis thereof, the limiting viscosity [η]I of the propylene homopolymer was 1.06 dL/g.

At the fourth tank which is a gas phase polymerization reactor disposed downstream of the third tank of the vessel type reactor and corresponding to the final gas phase polymerization reactor, propylene, ethylene, hydrogen and hexane were continuously supplied so as to keep a hydrogen concentration of 2.4 vol %, an ethylene concentration of 39.6 vol %, a propylene concentration of 45.3 vol %, a hexane concentration of 1.3 vol % and a heptane concentration of 0.0 vol % in the gas phase portion in the presence of the propylene homopolymer transferred continuously from the third tank, and propylene and ethylene were continuously copolymerized under conditions of a polymerization temperature of 70° C. and a polymerization pressure of 1.6 MPaG, however, the operation was stopped since the temperature in the fourth tank increased rapidly up to 85° C.

The production amount of the heterophasic propylene polymerization material was 20.2 kg/h. As a result of analysis of the resultant heterophasic propylene polymerization material, the limiting viscosity [η]T was 2.45 dL/g and the ethylene content (C'2) T was 41.90% by weight.

The content of the propylene-ethylene copolymer in the heterophasic propylene polymerization material generated at the fourth tank was 65.2% by weight. The limiting viscosity [η]II of the propylene-ethylene copolymer was 3.19 dL/g and the ethylene content (C'2)II in the propylene-ethylene copolymer was 54.29% by weight.

The resultant heterophasic propylene polymerization material was fine-particulate, and its median diameter was 2147 μm. Further, the static bulk density thereof was 0.406 g/mL and the amount of agglomerates having a diameter of 5 mm or more contained in the resultant heterophasic propylene polymerization material was 1395 ppm by weight, both of which being worse results with respect to the examples.

The analysis results of the resultant heterophasic propylene polymerization material are shown in Table 3.

TABLE 3

| | | heterophasic propylene polymerization material |
|---|---|---|
| [η]T | dL/g | 2.45 |
| (C'2)T | % by weight | 41.90 |
| [η] II | dL/g | 3.19 |
| (C'2)II | % by weight | 54.29 |
| content of propylene copolymer (II) | % by weight | 65.2 |
| β | g/g | 14059 |
| median diameter | μm | 2147 |
| static bulk density | g/mL | 0.406 |
| amount of agglomerate (5 mm or more) | ppm by weight | 1395 |

Comparative Example 2: Production of Heterophasic Propylene Polymerization Material (1-1a) Production of Solid Catalyst Component A solid catalyst component was produced in the same manner as in Example 1.

(1-1b) Preliminary Activation

Into an SUS autoclave equipped with a stirring machine were added 1.3 L of sufficiently dehydrated and deaerated hexane, 20 mmol/L of TEA, tert-butyl-n-propyldimethoxysilane as the electron donor component and 7.8 g/L of a solid catalyst component (I) having a median diameter of 59.5 μm, and propylene was continuously supplied while keeping the temperature in the autoclave at 15'C or less until the propylene supply amount per 1.0 g of the solid catalyst component reached 5.0 g, to carry out preliminary activation. The addition amount of tert-butyl-n-propyldimethoxysilane was 0.1 (mol/mol)=tert-butyl-n-propyldimethoxysilane/TEA. The slurry of the preliminarily activated catalyst was transferred to an SUS dilution tank equipped with a stirring machine, diluted by adding sufficiently purified liquid butane, and stored at a temperature of 10° C. or less. For preventing the slurry of the preliminarily activated catalyst from remaining in the autoclave and transferring its entire amount into the dilution tank, after transfer of the slurry of the preliminarily activated catalyst, the inside of the autoclave was washed with 1.3 L of sufficiently dehydrated and deaerated hexane and its washing liquid was transferred into the dilution tank. This washing operation was conducted three times. The concentration of the slurry of the preliminarily activated catalyst in the dilution tank was 0.10 g/L.

(1-1c) Polymerization

Using an apparatus in which three vessel type reactors equipped with a stirring machine and one gas phase polymerization reactor were serially disposed, continuous polymerization was conducted. At the first tank, the second tank and the third tank of the vessel type reactor, propylene was continuously homopolymerized to produce a propylene homopolymer, which was transferred to the fourth tank (that is, the above-described gas phase reactor) without deactivating the produced polymer, and at the fourth tank, propylene and ethylene were continuously copolymerized, to produce a propylene-ethylene copolymer.

At the first tank of the vessel type reactor, propylene was supplied at 10 kg/h and hydrogen was supplied at 32 NL/h, and further, TEA having a concentration of 250 mmol/L adjusted using sufficiently dehydrated and deaerated hexane was supplied at 23.1 mmol/h, tert-butyl-n-propyldimethoxysilane having a concentration of 50 mmol/L adjusted using sufficiently dehydrated and deaerated hexane was supplied at 4.3 mmol/h and the slurry of the preliminarily activated catalyst produced in (1-1b) was supplied so that the supply amount of the solid catalyst component was 0.50 g/h, and these were continuously polymerized at a polymerization temperature of 58'C and a polymerization pressure of 3.6 MPaG.

At the second tank of the vessel type reactor, propylene was supplied at 3 kg/h and hydrogen was supplied at 3 NL/h in the presence of the polymer transferred continuously from the first tank, and these were continuously polymerized under conditions of a polymerization temperature of 57° C. and a polymerization pressure of 3.0 MPaG.

At the third tank of the vessel type reactor, propylene was supplied at 3 kg/h in the presence of the polymer transferred continuously from the second tank, and these were continuously polymerized under conditions of a polymerization temperature of 52'C and a polymerization pressure of 2.7 MPaG, to obtain a propylene homopolymer.

The propylene homopolymer was partially extracted out of the system from the above-described third tank, and as a result of analysis thereof, the limiting viscosity [η]I of the propylene homopolymer was 1.06 dL/g.

At the fourth tank which is a gas phase polymerization reactor disposed downstream of the third tank of the vessel type reactor and corresponding to the final gas phase polymerization reactor, propylene, ethylene, hydrogen and heptane were continuously supplied so as to keep a hydrogen concentration of 2.3 vol $, an ethylene concentration of 41.6 vol %, a propylene concentration of 46.4 vol %, a hexane concentration of 0.1 vol % and a heptane concentration of 0.9 you in the gas phase portion in the presence of the propylene homopolymer transferred continuously from the third tank, and propylene and ethylene were continuously copolymerized under conditions of a polymerization temperature of 70° C. and a polymerization pressure of 1.6

MPaG, however, the operation was stopped since a decrease in the amount of the polymer extracted per every extraction valve operation was observed in extracting the polymer from the inside of the tank to the subsequent step. The production amount of the heterophasic propylene polymerization material was 20.2 kg/g. As a result of analysis of the heterophasic propylene polymerization material, the limiting viscosity [η]T was 2.07 dL/g and the ethylene content (C2')T was 26.10% by weight.

The content of the propylene-ethylene copolymer of the heterophasic propylene polymerization material generated at the fourth tank was 44.3% by weight. The limiting viscosity [η]II of the propylene-ethylene copolymer was 3.34 dL/g and the ethylene content (C'2)II in the propylene-ethylene copolymer was 58.90% by weight.

Further, the static bulk density of the resultant heterophasic propylene polymerization material was 0.388 g/mL and the amount of agglomerates having a diameter of 5 mm or more contained in the heterophasic propylene polymerization material was 19000 ppm by weight, both of which being worse results with respect to the examples. The analysis results of the resultant heterophasic propylene polymerization material are shown in Table 4.

TABLE 4

|  |  | heterophasic propylene polymerization material |
|---|---|---|
| [η]T | dL/g | 2.07 |
| (C'2)T | % by weight | 26.10 |
| [η]II | dL/g | 3.34 |
| (C'2)II | % by weight | 58.90 |
| content of propylene copolymer (II) | % by weight | 44.3 |
| β | g/g | 22503 |
| median diameter | μm |  |
| static bulk density | g/mL | 0.388 |
| amount of agglomerate (5 mm or more) | ppm by weight | 19000 |

Comparative Example 3: Production of Heterophasic Propylene Polymerization Material (1-1a) Production of Solid Catalyst Component Step (1-1A): The atmosphere in a 100 mL flask equipped with a stirring machine, a dropping funnel and a thermometer was purged with nitrogen, then, 36.0 mL of toluene and 22.5 mL of titanium tetrachloride were added into the flask and stirred, to obtain a toluene solution of titanium tetrachloride. The temperature in the flask was adjusted to 0° C., then, at the same temperature, 0.75 g of magnesium diethoxide (particle diameter: 37 μm) was added 10 times every 6 minutes. Thereafter, the components added into the flask were stirred at 0° C. for 90 minutes, and 0.60 mL of ethyl 2-ethoxymethyl-3,3-dimethylbutanoate was added into the flask. Then, the mixture was heated up to 10° C. and stirred at the same temperature for 2 hours, then, temperature elevation was started. During the temperature elevation, 4.80 mL of ethyl 2-ethoxymethyl-3,3-dimethylbutanoate was added into the flask at 60° C., and the mixture was heated up to 110° C. At the same temperature, the components added into the flask were stirred for 2 hours.

The resultant mixture was subjected to solid-liquid separation to obtain a solid. The solid was washed with 56.3 mL of toluene at 100° C. three times.

Step (1-1B): To the solid after washing was added 45.0 mL of toluene, to form a slurry. To the slurry was added 15.0 mL of titanium tetrachloride to form a mixture, which was heated up to 70° C. At the same temperature, 0.75 mL of ethyl 2-ethoxymethyl-3,3-dimethylbutanoate was added into the flask, then, the mixture was stirred at 110° C. for 1 hour. Thereafter, the mixture stirred was subjected to solid-liquid separation, and the solid was washed with 56.3 mL of toluene at 100° C. three times, and further, washed with 56.3 mL of hexane at room temperature three times, and the solid after washing was dried under reduced pressure, to obtain a solid catalyst component for olefin polymerization. This solid catalyst component had a median diameter of 33.0 μm.

(1-1b) Preliminary Activation

Into an SUS autoclave equipped with a stirring machine were added 1.2 L of sufficiently dehydrated and deaerated hexane, 18 mmol/L of TEA, tert-butyl-n-propyldimethoxysilane as the electron donor component and 8.7 g/L of a solid catalyst component (I) having a median diameter of 33.0 μm, and propylene was continuously supplied while keeping the temperature in the autoclave at 15° C. or less until the propylene supply amount per 1.0 g of the solid catalyst component reached 1.0 g, to carry out preliminary activation. The addition amount of tert-butyl-n-propyldimethoxysilane was 0.1 (mol/mol)=tert-butyl-n-propyldimethoxysilane/TEA. The slurry of the preliminarily activated catalyst was transferred to an SUS dilution tank equipped with a stirring machine, diluted by adding sufficiently purified liquid butane, and stored at a temperature of 10° C. or less. For preventing the slurry of the preliminarily activated catalyst from remaining in the autoclave and transferring its entire amount into the dilution tank, after transfer of the slurry of the preliminarily activated catalyst, the inside of the autoclave was washed with 1.2 L of sufficiently dehydrated and deaerated hexane, and its washing liquid was transferred into the dilution tank. This washing operation was conducted three times. The concentration of the slurry of the preliminarily activated catalyst in the dilution tank was 0.10 g/L.

(1-1c) Polymerization

Using an apparatus in which three vessel type reactors equipped with a stirring machine and one gas phase polymerization reactor were serially disposed, continuous polymerization was conducted. At the first tank, the second tank and the third tank of the vessel type reactor, propylene was continuously homopolymerized to produce a propylene homopolymer, which was transferred to the fourth tank (that is, the first tank of the above-described gas phase reactor) without deactivating the produced polymer, and at the fourth tank, propylene and ethylene were continuously copolymerized, to produce a propylene-ethylene copolymer.

At the first tank of the vessel type reactor, propylene was supplied at 40 kg/h and hydrogen was supplied at 224 NL/h, and further, TEA having a concentration of 250 mmol/L adjusted using sufficiently dehydrated and deaerated hexane was supplied at 23.2 mmol/h, tert-butyl-n-propyldimethoxysilane having a concentration of 50 mmol/L adjusted using sufficiently dehydrated and deaerated hexane was supplied at 4.6 mmol/h and the slurry of the preliminarily activated catalyst produced in (1-1b) was supplied so that the supply amount of the solid catalyst component was 0.33 g/h, and these were continuously polymerized at a polymerization temperature of 80° C. and a polymerization pressure of 4.4 MPaG.

At the second tank of the vessel type reactor, propylene was supplied at 24 kg/h and hydrogen was supplied at 124 NL/h in the presence of the polymer transferred continuously from the first tank, and these were continuously polymerized under conditions of a polymerization temperature of 77° C. and a polymerization pressure of 3.8 MPaG.

At the third tank of the vessel type reactor, propylene was supplied at 14 kg/h and hydrogen was supplied at 45 NL/h in the presence of the polymer transferred continuously from the second tank, and these were continuously polymerized under conditions of a polymerization temperature of 70° C. and a polymerization pressure of 3.6 MPaG, to obtain a propylene homopolymer.

The propylene homopolymer was partially extracted out of the system from the above-described third tank, and as a result of analysis thereof, the limiting viscosity [η]I of the propylene homopolymer was 0.89 dL/g.

At the fourth tank which is a gas phase polymerization reactor disposed downstream of the third tank of the vessel type reactor and corresponding to the final gas phase polymerization reactor, propylene, ethylene and hydrogen were continuously supplied so as to keep a hydrogen concentration of 1.5 vol %, an ethylene concentration of 20.2 vol % and a propylene concentration of 75.4 vol % in the gas phase portion in the presence of the propylene homopolymer transferred continuously from the third tank, and propylene and ethylene were continuously copolymerized under conditions of a polymerization temperature of 70° C. and a polymerization pressure of 1.8 MPaG, and after termination, the inside of the tank was confirmed, to find several agglomerates having the size of a fist.

The production amount of the heterophasic propylene polymerization material was 19.0 kg/h. As a result of analysis of the heterophasic propylene polymerization material, the limiting viscosity [η]T was 2.12 dL/g and the ethylene content (C'2)T was 15.79% by weight.

The content of the propylene-ethylene copolymer in the heterophasic propylene polymerization material generated at the fourth tank was 55.0% by weight. The limiting viscosity [η]II of the propylene-ethylene copolymer was 3.13 dL/g and the ethylene content (C'2)II in the propylene-ethylene copolymer was 28.70% by weight.

The median diameter of the resultant heterophasic propylene polymerization material was 1228 μm. Further, the static bulk density was 0.372 g/mL and the number of agglomerates having a diameter of 5 mm or more contained in the heterophasic propylene polymerization material was 2385 ppm by weight, both of which being worse results with respect to the examples. The analysis results of the resultant heterophasic propylene polymerization material are shown in Table 5.

TABLE 5

|  |  | heterophasic propylene polymerization material |
|---|---|---|
| [η]T | dL/g | 2.12 |
| (C'2)T | % by weight | 15.79 |
| [η]II | dL/g | 3.13 |
| (C'2)II | % by weight | 28.70 |
| content of propylene copolymer (II) | % by weight | 55.0 |
| β | g/g | 25909 |
| median diameter | μm | 1228 |
| static bulk density | g/mL | 0.372 |
| amount of agglomerate (5 mm or more) | ppm by weight | 2385 |

The results of Examples 1 and 2 and Comparative Examples 1 to 3 are shown in Table 6. In Table 6, the solid catalyst component 1 denotes a solid catalyst component in Examples 1 and 2 and Comparative Examples 1 and 2, and the solid catalyst component 2 denotes a solid catalyst component in Comparative Example 3.

TABLE 6

|  | Example 1 | Example 2 | Comparative Example 1 | Comparative Example 2 | Comparative Example 3 |
|---|---|---|---|---|---|
| hexane concentration in gas phase polymerization tank in step (2) (% by volume) | 0.2 | 0.3 | 1.3 | 0.1 | 0.0 |
| heptane concentration in gas phase polymerization tank in step (2) (% by volume) | 0.3 | 0.0 | 0.0 | 0.9 | 0.0 |
| content of propylene copolymer (II) (% by weight) | 65.2 | 65.4 | 65.2 | 44.3 | 55.0 |
| [η]II (dL/g) | 3.10 | 3.08 | 3.19 | 3.34 | 3.13 |
| type of solid catalyst component | solid catalyst component 1 | solid catalyst component 1 | solid catalyst component 1 | solid catalyst component 1 | solid catalyst component 2 |
| median diameter of solid catalyst component (μm) | 59.5 | 59.5 | 59.5 | 59.5 | 33.0 |
| α(1.34β)$^{1/3}$ | 1626 | 1590 | 1583 | 1852 | 1077 |
| median diameter of heterophasic propylene polymerization material (μm) | 2045 | 1974 | 2147 | unmeasured | 1228 |
| operability | ○ | ○ | x | x | x |
| static bulk density (g/mL) | 0.440 | 0.465 | 0.406 | 0.388 | 0.372 |
| amount of agglomerate (5 mm or more) (ppm by weight) | 458 | 320 | 1395 | 19000 | 2385 |

INDUSTRIAL APPLICABILITY

The heterophasic polypropylene polymerization material obtained by the production method of the present invention can be used as the raw material of, for example, automobile parts such as automobile interior parts and exterior parts and the like, food and medical containers, furniture and electric appliance parts, civil engineering and construction materials and the like.

The invention claimed is:

1. A production method of the following heterophasic propylene polymerization material comprising a propylene homopolymer (I-1) or a propylene copolymer (I-2), and a propylene copolymer (II), the production method comprising the following step (1) and the following step (2):

step (1): a step of polymerizing a monomer containing propylene in the presence of a catalyst for propylene polymerization to produce a propylene homopolymer (I-1) or a propylene copolymer (I-2), the step satisfying the following formula (A):

$$1100 \leq \alpha(1.34\beta)^{1/3} \quad (A)$$

wherein, in the formula (A),

α represents a median diameter (unit: μm) of the catalyst for propylene polymerization, β represents a production amount (unit: g/g) of the propylene homopolymer (I-1) or the propylene copolymer (I-2) per 1 g of the catalyst for propylene polymerization in the step (1);

step (2): a step of copolymerizing at least one olefin selected from the group consisting of ethylene and α-olefins having a number of carbon atoms of 4 or more and 12 or less, and propylene in the presence of the propylene homopolymer (I-1) or the propylene copolymer (I-2) obtained in the step (1), using one or more gas phase polymerization reactors, to produce a propylene copolymer (II), wherein a concentration of alkanes having a number of carbon atoms of 6 or more in the final gas phase polymerization reactor of the one or more gas phase polymerization reactors is 0.01% by volume or more and 0.6% by volume or less;

wherein the heterophasic propylene polymerization material is a heterophasic propylene polymerization material comprises a propylene homopolymer (I-1) or the following propylene copolymer (I-2), and the following propylene copolymer (II), wherein a content of the propylene copolymer (II) is 30% by weight or more, based on a total weight of the heterophasic propylene polymerization material taken as 100% by weight;

propylene copolymer (I-2) is a propylene copolymer containing a monomer unit derived from propylene and a monomer unit derived from at least one olefin selected from the group consisting of ethylene and α-olefins having a number of carbon atoms of 4 or more and 12 or less, wherein a content of the monomer unit derived from at least one olefin selected from the group consisting of ethylene and α-olefins having a number of carbon atoms of 4 or more and 12 or less is 0.01% by weight or more and less than 15% by weight, based on a total weight of the propylene copolymer (I-2) taken as 100% by weight;

propylene copolymer (II) is a propylene copolymer containing a monomer unit derived from at least one olefin selected from the group consisting of ethylene and α-olefins having a number of carbon atoms of 4 or more and 12 or less and a monomer unit derived from propylene, wherein a content of the monomer unit derived from at least one olefin selected from the group consisting of ethylene and α-olefins having a number of carbon atoms of 4 or more and 12 or less is 15% by weight or more and 80% by weight or less, based on a total weight of the propylene copolymer (II) a taken as 100% by weight.

2. The production method of the heterophasic propylene polymerization material according to claim 1, wherein a concentration of alkanes having 6 carbon atoms in the final gas phase polymerization reactor in the step (2) is 0.01% by volume or more and 0.3% by volume or less.

3. The production method of the heterophasic propylene polymerization material according to claim 1, wherein the content of the propylene copolymer (II) in the heterophasic propylene polymerization material is 40% by weight or more.

* * * * *